United States Patent [19]

Nishimura et al.

[11] 4,363,039

[45] Dec. 7, 1982

[54] AUTOMATIC OPERATION CONTROL APPARATUS FOR A PCM RECORDING AND REPRODUCING SYSTEM

[75] Inventors: Keizo Nishimura, Yokohama; Yasunori Kanazawa, Hachioji, both of Japan

[73] Assignee: Hitachi, Ltd., Tokyo, Japan

[21] Appl. No.: 63,475

[22] Filed: Aug. 3, 1979

[30] Foreign Application Priority Data

Aug. 7, 1978 [JP] Japan .................................. 53-95494

[51] Int. Cl.³ ............................................ H04N 5/785
[52] U.S. Cl. .................................. 360/19.1; 360/74.4
[58] Field of Search ..................... 358/127, 128.6, 147, 358/145; 360/14, 27, 71, 37, 72.2, 74.4, 19

[56] References Cited

U.S. PATENT DOCUMENTS

| | | | |
|---|---|---|---|
| 3,507,985 | 4/1970 | Breukink et al. .................... | 358/147 |
| 3,859,458 | 1/1975 | Takezawa et al. ............. | 358/147 X |
| 4,159,480 | 6/1979 | Tachi .............................. | 358/127 X |
| 4,167,759 | 9/1979 | Tachi ................................ | 360/14 |
| 4,170,026 | 10/1979 | Nagaoka et al. ................ | 358/147 X |
| 4,199,779 | 4/1980 | Nagaoka et al. .................. | 360/37 X |
| 4,295,154 | 10/1981 | Hata et al. ......................... | 360/19 X |

FOREIGN PATENT DOCUMENTS

| | | | |
|---|---|---|---|
| 52-5210 | 1/1977 | Japan .................................. | 358/147 |
| 52-5212 | 1/1977 | Japan .................................. | 358/147 |

OTHER PUBLICATIONS

Davies, "Versatile System for the Automation of Video-Tape Editing", Journal of the SMPTE, vol. 79, Mar. 1970, pp. 197 +.

*Primary Examiner*—Bernard Konick
*Assistant Examiner*—Donald McElheny, Jr.
*Attorney, Agent, or Firm*—Antonelli, Terry & Wands

[57] ABSTRACT

A PCM recording system uses vertical and horizontal synchronizing signals like those of a television video signal, and records PCM sound signal data taking the form of PCM signals converted from a sound signal during specific ones of plural horizontal scanning periods disposed between the vertical synchronizing signals. At least one control signal such as an absolute address signal representing a tape position, an operation indicating signal for indicating the operations such as a tape running stop and a tape rewind and an adjusting signal for adjusting a reproducing system is recorded during the horizontal scanning period with no recording of the PCM sound signal data. At the time of signal reproducing, the control signal is extracted to perform a given display or a given control.

16 Claims, 12 Drawing Figures

AUTOMATIC OPERATION CONTROL APPARATUS FOR A PCM RECORDING AND REPRODUCING SYSTEM

BACKGROUND OF THE INVENTION

1. Field of the Invention

The invention relates to a PCM recording system with a synchronizing signal like that of a television video signal.

2. Description of the Prior Art

In a conventional tape index counter to indicate a tape running position, a rotation of a tape reel 1 is transferred by a belt 2 to a mechanical counter 3 and then the mechanical counter 3 indicates the number of rotations of the tape reel 1, as shown in FIG. 1. The index counter accordingly does not indicate a real position of a running tape but does only the number of rotations of a take-up (or feeding) reel. Therefore, the index counter must be reset at the start of the tape winding, for example. A winding condition of the tape or a slip of the belt causes the counter to frequently indicate an erroneous indication, with the result that it is almost impossible to know a correct running tape position. Furthermore, the conventional index counter is insufficient for knowing the remaining time of the tape running. Additionally, even if the tape used has a fixed length, an indication by the index counter changes depending on the thickness of the tape, and the start or the end of the tape winding.

In order to automatically stop or rewind the running tape at a desired position, conventional measures taken for this are the use of an indication by the above-mentioned index counter, the use of a conductive sensing foil sticked onto the tape surface, and the like. The measure using the index counter, however, suffers from disadvantages as mentioned above such as poor accuracy of the tape position detection. The measure using the sensing foil is disadvantageous in that the sticking work of the sensing foil is troublesome, the sensing foil once sticked is hard in peeling it from the tape, and it is problematic when it is applied to the cassette type tape.

An additional disadvantage listed of the conventional PCM reproducing system is to require a separate test tape with a special random pattern record for adjusting a PCM signal distinguishing level, i.e. a slice level of 0 and 1.

SUMMARY OF THE INVENTION

Accordingly, an object of the invention is to provide a PCM recording and reproducing system which is able to accurately indicate a position of a running tape or a remaining amount of the tape, to automatically stop or rewind a running tape at a desired position without using the sensing foil, and to adjust a tape reproduction system without using a special test tape.

In brief, a PCM recording and reproducing system provided according to the invention records PCM signal data during a specific horizontal scanning period of those disposed between vertical synchronizing signals. At least one control signal such as an absolute address signal representing a position on the tape, signals for indicating operations such as the stop or the rewind of a running tape, a signal for adjusting a reproducing system and the like, is recorded during a horizontal scanning period where the PCM signal is not recorded. By extracting the control signal recorded at the time of signal reproducing, the tape running position display, the automatic stop and rewind of the tape and the adjustment of the reproducing system are performed.

Other objects and features of the invention will be apparent from the following description taken in connection with the accompanying drawings.

DETAILED DESCRIPTION OF THE PREFERRED EMBODIMENTS

Figure 1:
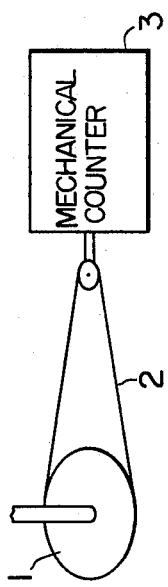
FIG. 1 shows a schematic representation of a conventional tape index display system.
Figure 2:
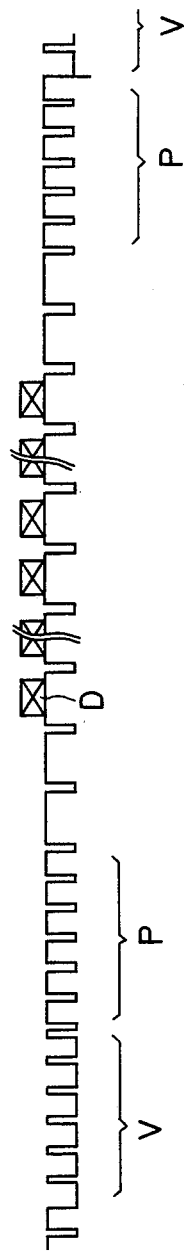
FIG. 2 shows an example of a signal waveform of PCM recording system with a synchronizing signal like that of a television video signal.

A PCM recording system with a synchronizing signal like that of a television video signal generally uses a signal with a waveform as shown in FIG. 2. In the figure, V designates vertical synchronizing pulses and P equalizing pulses. Between a group of the vertical synchronizing pulses V and another group of the vertical synchronizing pulses V are disposed PCM sound signal data D in the form of PCM signals. Embodiments of a recording section of a PCM recording system according to the invention will be described below with reference to FIGS. 3 to 6.

Figure 3:
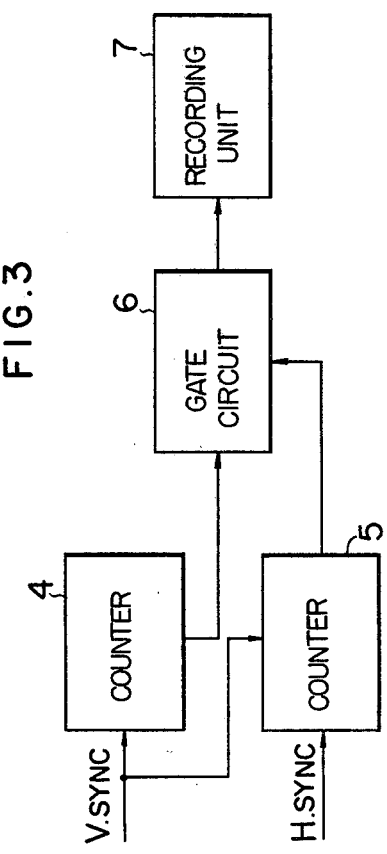
FIGS. 3 to 6 show block diagrams of four embodiments of a recording section of a PCM recording system according to the invention.

FIG. 3 shows a block diagram of an embodiment for recording an absolute address representing a position on a magnetic tape during a given horizontal scanning period of a signal recorded on the magnetic tape. In FIG. 3, reference numeral 4 designates a counter for counting the number of vertical synchronizing signals from the start of tape running. Reference numeral 5 denotes a counter for counting the number of horizontal synchronizing signals within a vertical scanning period. The counter 5 is reset by the vertical synchronizing signal. The outputs of the counters 4 and 5 are coupled with a gate circuit 6. When the counter 5 detects a horizontal scanning period where a given value, i.e. PCM signal data, is not recorded, the gate 6 permits the transmission of data from the counter 4 to a recording unit 7. The recording unit 7 records the contents of the counter 4 delivered from the gate circuit 6 on the magnetic tape. Here, the contents of the counter 4 are represented by a signal corresponding to the length of the tape travelled from the start of the tape travelling. Accordingly, a signal representing an index of position on the tape may be recorded.

Figure 4:
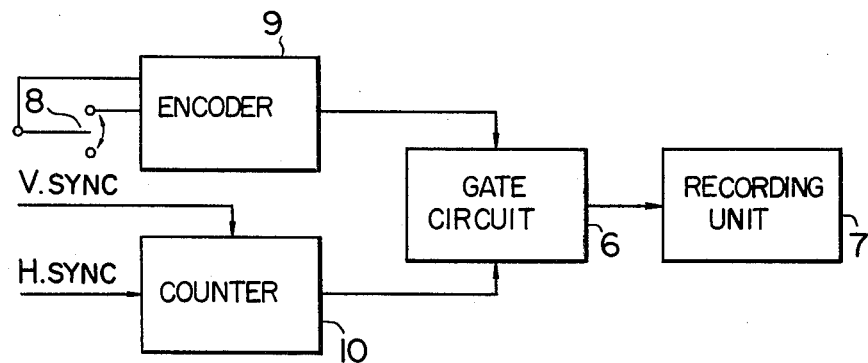

FIG. 4 shows in block form an embodiment for recording during a given horizontal scanning period an operation indication signal (one of the control signals) for automatically stopping or rewinding the tape at a given position on the tape. In FIG. 4, a switch 8 is used to switch a control signal to be recorded between the stop and the rewind sides. An encoder 9 transfers the stop or the rewind control signal to a gate circuit 6 in accordance with the position of the switch 8.

A counter 10, like the counter shown in FIG. 3, transfers a control signal from the encoder 9 to the recording unit 7 during a given horizontal scanning period, through the gate circuit 6. When a value of the counter 10 reaches a predetermined value, for example, only during one horizontal scanning period, the gate circuit 6 is enabled. Upon the enabling, the gate circuit 6 permits the control signal from the encoder 8 to go to the recording unit 7. Then, the recording unit 7 records the control signal received on the magnetic tape. In brief, at the time of the PCM sound signal data recording, if the switch 8 is turned to the stop or the rewind side at the end of the data recording, the control signal may be recorded during a given horizontal scanning period of the tape.

Figure 5:
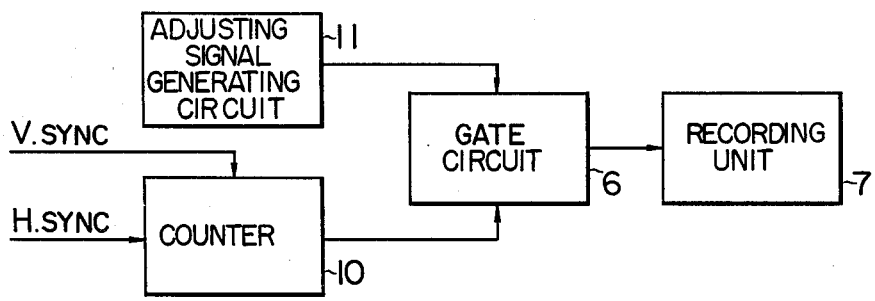

FIG. 5 shows a block diagram of an embodiment for recording an adjusting signal (random pattern) for adjusting the PCM signal distinguishing level of the PCM reproducing system during a given horizontal scanning period on the tape. The adjusting signal generating circuit 11 produces an adjusting signal suitable for adjusting the distinguishing level of the reproducing system and then applies it to a gate circuit 6. A counter 10 is reset by a vertical synchronizing signal and then counts the number of horizontal synchronizing signals between vertical synchronizing signals within a vertical scanning period. With the progression of the counting, it reaches a given count. At that time, it transfers a gate signal to the gate circuit 6. For example, it produces one gate signal every vertical scanning period. Upon receipt of the gate signal from the counter 10, the gate circuit 6 permits the adjusting signal from the adjusting signal generating circuit 11 to pass therethrough to the recording unit 7 during one horizontal scanning period. The gate signal from the counter 10 appears during the horizontal scanning period where no PCM sound signal data is recorded. The recording unit 7 records the adjusting signal on the magnetic tape without interferring with the PCM sound signal.

Figure 6:
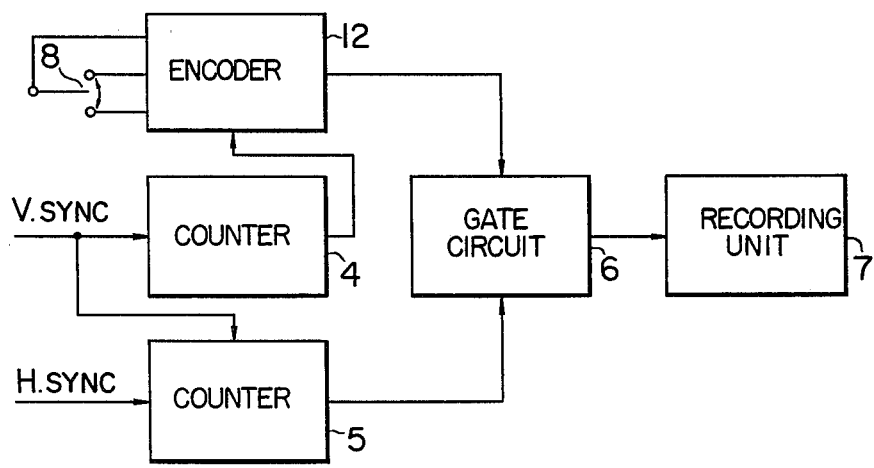

An additional embodiment for recording the control signal according to the invention is shown in FIG. 6.

The embodiment of FIG. 6, which is the combination of the embodiments of FIG. 3 and FIG. 4, simultaneously records an absolute address representative of a position on the tape and a control signal for the automatic stop or rewind of the tape. The PCM recording system with a synchronizing signal like that of an ordinary television video signal can record data of 100 bits or more during one horizontal scanning period. When the recording time of the tape is two hours, the number of the vertical scanning periods is approximately 450,000. If the absolute address is recorded one time for each vertical scanning period, 24 bits suffice for the number of bits necessary for the absolute address, even when the BCD code is used. Therefore, the remaining bit or bits, i.e. the other than bits used for the absolute address, may be used for recording the control signal to make the automatic stop or rewind of the tape.

In the operation of the embodiment shown in FIG. 6, the counter 4 counts the number of the vertical synchronizing signals from the start of the tape running, like the embodiment of FIG. 3. The output of the counter 4 enters the encoder 12. The encoder 12 mixes the output of the counter 4 and the control signal of the start or the rewind corresponding to a position to which the switch 8 is turned, and sends the mixed one to the gate circuit 6. As in the embodiment of FIG. 3, the counter 5 sends a gate signal to the gate circuit 6 when the horizontal scanning period with no recording of the PCM sound signal data appears. At that time, the absolute signal address from the encoder 12 and the control signal for the stop or the rewind is sent to the recording unit 7, so that it is recorded on the tape.

Figure 7:
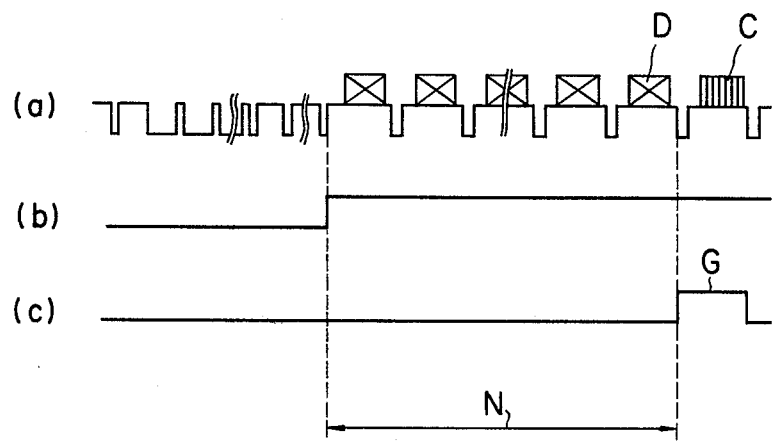
FIG. 7 shows a set of waveforms of recording signals and related signals used in the present invention.

An example of the signal waveform used in the above-mentioned embodiment is illustrated in FIG. 7. In the figure, FIG. 7(c) shows a control signal waveform recorded during the horizontal scanning period with no recording of the PCM sound signal data D.

The reproduction of the control signal recorded as shown in FIG. 7 such as the absolute address signal will be described with reference to FIGS. 8 to 12.

Figure 8:
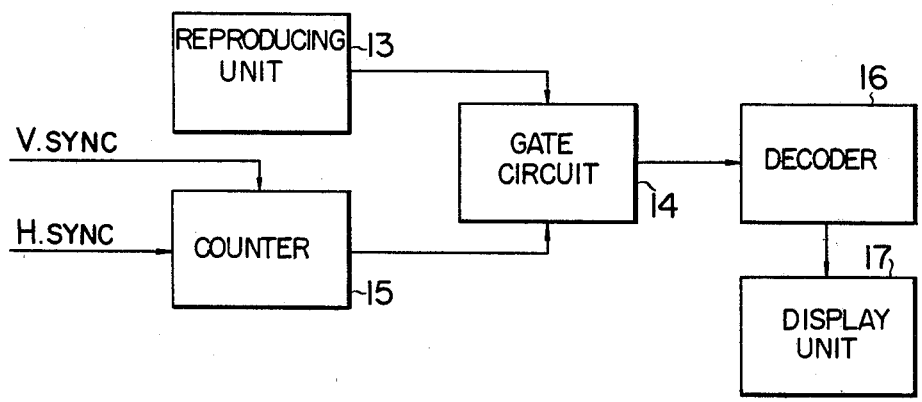
FIGS. 8 to 12 show block diagrams of five embodiments of a reproducing section of the PCM recording system according to the invention.

FIG. 8 shows a block diagram of an embodiment of a system for displaying a tape position by extracting an absolute address signal C when the control signal C recorded as shown in FIG. 7(a) is the absolute address. A reproducing unit 13 picks up a signal recorded on the magnetic tape and sends it to the gate circuit 14. The counter 15 is reset by the vertical synchronizing signal to count the number of the horizontal scanning signal within the vertical scanning period. When it counts the given number of the horizontal synchronizing signals, it sends the gate signal as shown in FIG. 7(c) to the gate circuit 14. Accordingly, the gate circuit 14 sends to a decoder 16 data recorded during the horizontal scanning period at that time, that is to say, the absolute address signal C. The decoder 16 drives the display unit 17 to display an absolute address signal C sent from the gate circuit 14. An operator sees the absolute address displayed to know a position on the tape. Additionally, if the last address of the tape is previously stored in the decoder 16 and the decoder 16 is so designed that an absolute address signal from the gate circuit 14 is subtracted from the last address previously set, the remaining amount of the tape may correctly be known.

Figure 9:
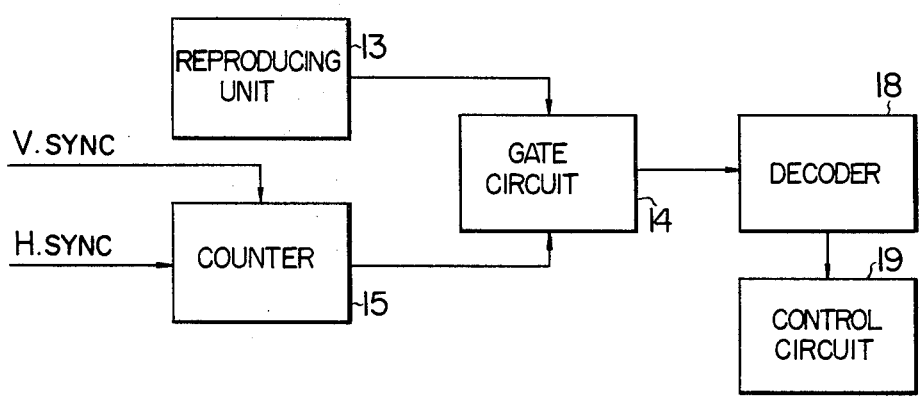

An embodiment in block form illustrated in FIG. 9 uses a control signal C when the control signal C recorded as shown in FIG. 7(a) is a control signal to stop or rewind the tape. The operations of the reproducing unit 13, the gate circuit 14 and the counter 15 are exactly the same as those in the FIG. 8 embodiment. Sent to the decoder 18 is a control signal C recorded at the position of the gate signal G in FIG. 7(c). The decoder 18 judges as to whether the control signal is for stop, rewind or nothing. On the basis of the judgement, the decoder 18 sends a signal to a control circuit 19. Upon the receipt of the signal, the control circuit drives a drive mechanism to execute the stop or the rewind of the tape.

Figure 10:
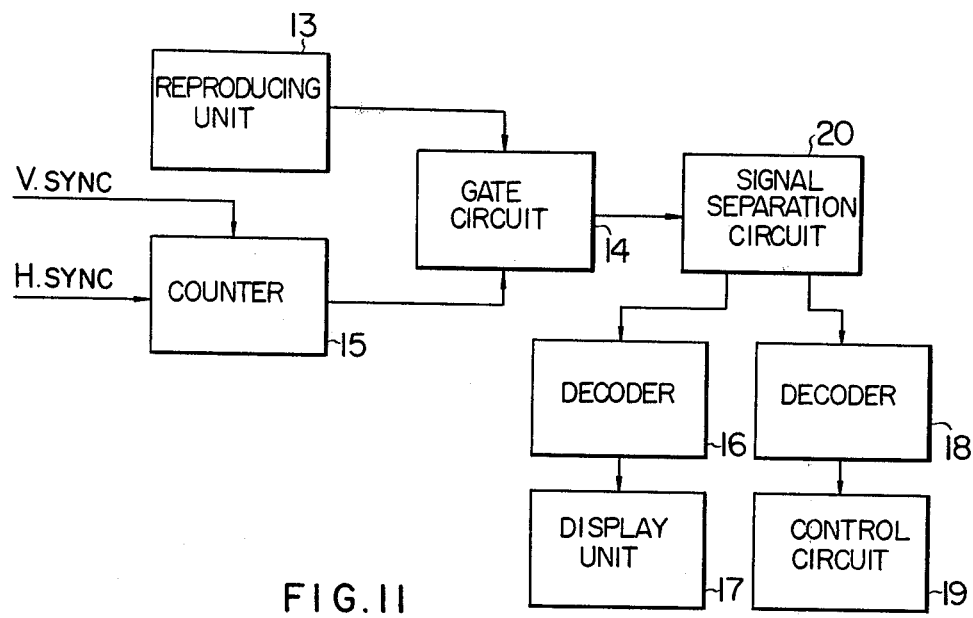

An embodiment shown in FIG. 10 is a reproducing system when an absolute address signal of the tape and the control signal for the tape stop or rewind are simultaneously recorded during a given horizontal scanning period. A reproducing unit 13, a gate circuit 14, and a counter 15 are similar to those shown in FIGS. 8 and 9. A control signal such as an absolute address signal recorded as shown in FIG. 7(a) is extracted and is transferred to a signal separation circuit 20. Then, the signal separation circuit 20 separates a signal sent from the gate circuit 14 into an absolute address signal and a control signal which in turn are transferred to the decoder 16 and another decoder 18. The decoder 16 displays an absolute address of the tape in the display unit 17, as in the embodiment shown in FIG. 8 and the decoder 18 judges whether the control signal is for tape running stop or tape rewind or nothing thereby to energize a control circuit which in turn drives the drive mechanism to execute the tape running stop or the tape rewind.

Figure 11:
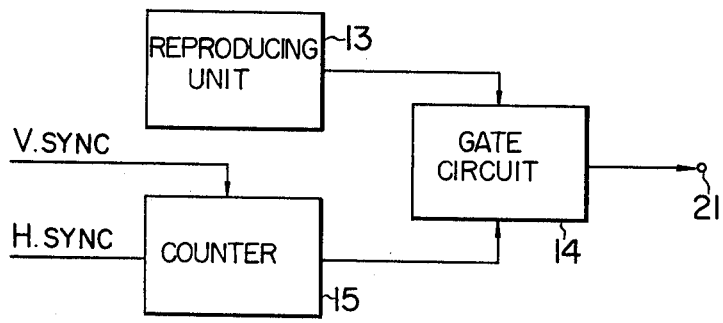

An embodiment illustrated in FIG. 11 reproduces an adjusting signal when a control signal recorded as shown in FIG. 7(a) is an adjusting signal (random pattern) for adjusting the reproducing system. The counter 15 is set by a vertical synchronizing signal and counts the number of the horizontal synchronizing signals. When a given horizontal scanning period with the adjusting signal C recorded appears, a gate signal as shown in FIG. 7(c) is applied to the gate circuit 14. In response to the signal, the gate circuit 14 sends a signal from the reproducing unit 13 to the output terminal 21 only during this period, so that only the adjusting signal is applied to the output terminal 21. Accordingly, the reproducing system may be adjusted by the adjusting signal at any desired time without using a special tape.

Figure 12:
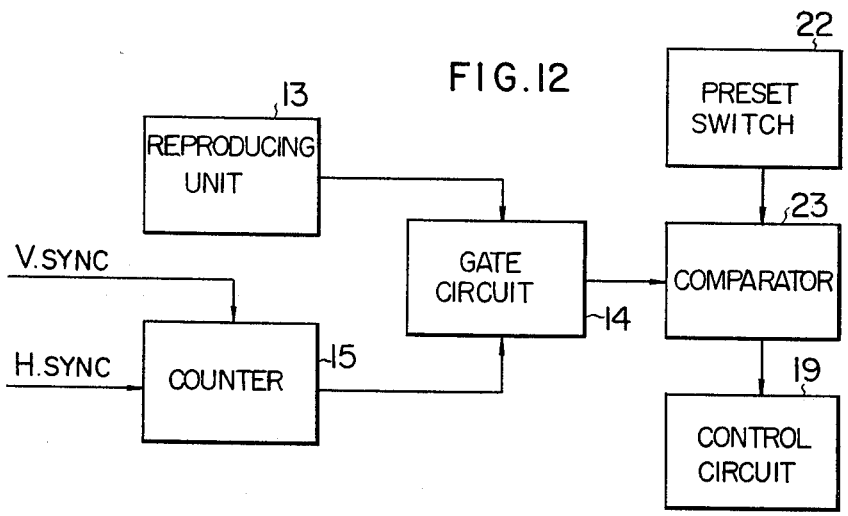

FIG. 12 shows an embodiment of a system for automatically stopping or rewinding the tape by using the absolute address signal obtained by the embodiment shown in FIG. 8. A reproducing unit 13, a gate circuit 14 and a counter 15 operate in the same manner as those of the FIG. 8 embodiment. The gate 14 sends to a comparator 23 an absolute address signal C recorded during a given horizontal scanning period for each vertical scanning period of the tape. In a preset switch 22, an absolute address signal to stop or rewind the tape is preset and the preset signal is inputted to the comparator 23. When the preset signal is coincident with a numerical value of the absolute address signal C, the comparator 23 applies a control signal for the tape running stop or the tape rewind to the control circuit 19 which in turn stops or rewinds the tape in response to the signal from the comparator 23. In this way, the tape may automatically be stopped or rewound at a correct position on the tape. Incidentally, FIG. 7(b) designates a vertical synchronizing signal.

As seen from the foregoing description, a PCM recording system according to the invention may display an absolute address as an index of a position on the magnetic tape which is directly recorded on the tape.

Further, when the PCM recording system is used, one can know a correct tape running position or a correct amount of the tape irrespective of the thickness of the tape, the start or the end of the tape winding.

Furthermore, the PCM recording system according to the invention may automatically stop or rewind the tape at a correct position without using a sensing foil sticked. Additionally, an adjusting signal enabling the reproducing system to be adjusted without using a special test tape may be recorded on the tape without disturbing the PCM sound signal data, enabling the adjustment for the distinguishing level of the PCM reproducing system at all times.

What is claimed is:

1. An automatic operation control apparatus for a PCM recorder system in which a PCM signal is recorded on a recording medium together with vertical and horizontal synchronizing signals, the PCM signal including a PCM sound signal recorded on the recording medium during a predetermined first horizontal scanning period of a plurality of horizontal scanning periods arranged between vertical synchronizing signals, the automatic operation control apparatus comprising a recording operation device including:

detector means including a recording counter for detecting a second horizontal scanning period between the vertical synchronizing signals, the second horizontal scanning period being different from the first horizontal scanning period, the recording counter being reset by the vertical synchronizing signals to initiate counting of the horizontal synchronizing signals;

means for generating at least an operation control signal for enabling control of a drive mechanism for the recording medium during a reproduction operation; and means for recording on the recording medium the operation control signal generated by said operation control signal generator means when said detector means detects the second horizontal scanning period;

whereby the recording medium includes the operation control signal in at least one second horizontal scanning period between the vertical synchronizing signals, the operation control signal being reproducible for enabling control of the recording medium during a reproduction operation.

2. An automatic operation control apparatus according to claim 1, further comprising a reproduction operation device including:

means for extracting and reproducing during a reproduction operation at least the operation control signal from the recording medium on which the PCM signal and operation control signal are recorded; and control circuit means responsive to the extracted operation control signal extracted by said extracting and reproducing means from the recording medium for controlling operation of said drive mechanism for the recording medium during the reproduction operation in accordance with the extracted operation control signal.

3. An automatic operation control apparatus according to claim 2, wherein said extracting and reproducing means comprises:

a unit for reproducing signals from the recording medium, the signals including at least the extracted operation control signal and vertical and horizontal synchronizing signals;

a reproducing counter responsive to the vertical synchronizing signals supplied from said reproducing unit for being reset to initiate counting of the horizontal synchronizing signals supplied from said reproducing unit so as to detect the second horizontal scanning period and to provide an output indicative thereof; and a gate circuit supplied with at least the extracted operation control signal from said reproducing unit and responsive to the output of said reproducing counter indicating detection of the second horizontal scanning period for passing at least the extracted operation control signal therethrough, said control circuit means being responsive to the passed extracted operation control signal.

4. An automatic operation control apparatus according to claim 1, 2 or 3, wherein said operation control signal generating means also generates an absolute address signal for the recording medium, said recording means recording the absolute address signal and operation control signal on the recording medium when said detector means detects the second horizontal scanning period.

5. An automatic operation control apparatus according to claim 4, wherein said extracting and reproducing means further reproduces the absolute address signal recorded on the recording medium, and further comprising:

separator means for separating the absolute address signal and extracted operation control signal; and display means responsive to the separated absolute address signal for displaying an output indicative thereof, said control circuit means being responsive to the separated extracting operation control signal.

6. An automatic operation control apparatus according to claim 4, wherein the recording medium is a tape and the synchronizing signals correspond to video synchronizing signals, and further comprising a changeover switch, said operation control signal generator means being responsive to the position of the switch for generating as the operation control signal for use during a reproduction operation one of a tape stopping signal and a tape rewinding signal.

7. An automatic operation control apparatus according to claim 1, wherein the recording medium is a tape and the synchronizing signals correspond to video synchronizing signals, and further comprising a changeover switch, said operation control signal generator means being responsive to the position of the switch for generating as the operation control signal for use during a reproduction operation at least a selected one of a tape stopping signal and a tape rewinding signal.

8. An automatic operation control apparatus for a PCM recorder system in which a PCM signal is recorded on a recording medium together with vertical and horizontal synchronizing signals, the PCM signal including a PCM sound signal recorded on the recording medium during a predetermined first horizontal scanning period of a plurality of horizontal scanning periods arranged between vertical synchronizing signals, at least an operation control signal being recorded on the recording medium during a second horizontal scanning period different from the first horizontal scanning period, for reproduction operation the recording medium being driven by a drive mechanism, and the PCM signal and the vertical and horizontal synchronizing signals being reproduced from the recording medium, the automatic operation control apparatus comprising a reproduction operation device including:

means for extracting and reproducing at least the operation control signal from the recording medium on which the PCM signal and operation control signal are recorded; and control circuit means responsive to the extracted operation control signal extracted by said extracting and reproducing means from the recording medium for controlling operation of the drive mechanism for the recording medium during the reproduction operation in accordance with the extracted operation control signal.

9. An automatic operation control apparatus according to claim 8, wherein said extracting and reproducing means comprises:

a unit for reproducing signals from the recording medium, the signals including at least the extracted operation control signal and vertical and horizontal synchronizing signals;

a reproduction counter responsive to the vertical synchronizing signals supplied from said reproducing unit for being reset to initiate counting of the horizontal synchronizing signals supplied from said reproducing unit so as to detect the second horizontal scanning period and to provide an output indicative thereof; and a gate circuit supplied with at least the extracted operation control signal from said extracting and reproducing unit and responsive to the output of said reproduction counter indicating detection of the second horizontal scanning period for passing at least the extracted operation control signal therethrough, said control circuit means being responsive to the passed extracted operation control signal.

10. An automatic operation control apparatus according to claim 9, wherein the recording medium is a tape and the operation control signal is at least one of a tape stopping signal and a tape rewinding signal for use during the reproduction operation.

11. An automatic operation control apparatus according to claim 8 or 9, wherein the recording medium also includes an absolute address signal for the recording medium recorded during the second horizontal scanning period, said extracting and reproducing means further reproducing the absolute address signal recorded on the recording medium, and further comprising:

separator means for separating the absolute address signal and the extracted operation control signal; and display means responsive to the separated absolute address signal for displaying an output indicative thereof, said control circuit means being responsive to the separated extracted operation control signal.

12. An automatic operation control apparatus according to claim 11, wherein the recording medium is a tape, and the operation control signal is one of a tape stopping signal and a tape rewinding signal for use during the reproduction operation.

13. An automatic operation control apparatus for a PCM recorder system in which a PCM signal is recorded on a recording medium together with vertical and horizontal synchronizing signals, the PCM signal including a PCM sound signal recorded on the recording medium during a predetermined first horizontal scanning period of a plurality of horizontal scanning periods arranged between vertical synchronizing signals, the automatic operation control apparatus comprising a recording operation device including:

detector means including a recording counter for detecting a second horizontal scanning period between the vertical synchronizing signals, the second horizontal scanning period being different from the first horizontal scanning period, the recording counter being reset by the vertical synchronizing signals to initiate counting of the horizontal synchronizing signals;

means for generating an absolute address signal in accordance with a count of the vertical synchronizing signals; and means for recording on said recording medium the absolute address signal generated from said absolute address signal generator means when said detector means detects the second horizontal scanning period;

whereby the recording medium includes the absolute address signal in the second horizontal scanning period between the vertical synchronizing signals.

14. An automatic operation control apparatus according to claim 13 wherein the recording medium is driven by a drive mechanism, further comprising a reproduction operation device including:

reproducing means for reproducing signals recorded on the recording medium including at least the absolute address signal and the vertical and horizontal synchronizing signals;

a reproducing counter responsive to the vertical synchronizing signal supplied from said reproducing means for being reset to initiate counting of the horizontal synchronizing signals supplied from said reproducing means so as to detect the second horizontal scanning period and to provide an output indicative thereof;

a gate circuit supplied with at least the absolute address signal from said reproducing means and responsive to the output of the reproducing counter indicating detection of the second horizontal scanning period for passing at least the absolute address signal therethrough;

presetting means for indicating a desired absolute address on the recording means;

comparator means for comparing the absolute address provided by said presetting means with the absolute address signal passed through said gate circuit, said comparator means providing a coincidence signal output when the absolute address from said presetting means and the absolute address signal coincide; and control circuit means responsive to the coincidence signal from said comparator means for controlling an operation of the drive mechanism for the recording medium in response to the coincidence signal.

15. An automatic operation control apparatus according to claim 14, wherein said absolute address signal generating means includes a counter for counting the vertical synchronizing signals on the recording medium as an indication of position on the recording medium.

16. An automatic operation control apparatus according to claim 13, wherein the recording medium is a tape and the synchronizing signals correspond to video synchronizing signals.

* * * * *